United States Patent [19]

Behrend et al.

[11] 4,450,923

[45] May 29, 1984

[54] ELECTRONIC WEIGHING SCALE

[75] Inventors: Lothar Behrend, Diemarden; Erich Knothe, Bovenden; Franz-Josef Melcher; Jürgen Ober, both of Hardegsen, all of Fed. Rep. of Germany

[73] Assignee: Sartorius GmbH, Fed. Rep. of Germany

[21] Appl. No.: 450,676

[22] Filed: Dec. 17, 1982

[30] Foreign Application Priority Data

Dec. 12, 1981 [DE] Fed. Rep. of Germany ....... 3149990

[51] Int. Cl.³ .......................... G01G 1/38; G01G 3/14; G01R 17/06
[52] U.S. Cl. .............................. 177/212; 177/210 EM; 324/990
[58] Field of Search ....................... 177/210 EM, 212; 324/99 R, 99 D

[56] References Cited

U.S. PATENT DOCUMENTS 3,048,778  8/1982  Rumpel ........................ 324/99 R X
4,099,587  7/1978  Kaufmann ..................... 177/212 X
4,300,647  11/1981  Knothe et al. ..................... 177/212

Primary Examiner—E. A. Goldberg
Assistant Examiner—Patrick W. Foster
Attorney, Agent, or Firm—Eric P. Schellin

[57] ABSTRACT

It is known in high-resolution electronic weighing scales based on the principle of electromagnetic force compensation that the load-dependent development of heat in the coil and the precision resistor can be compensated by sending an additional alternating current through the coil and the precision resistor which is complementarily regulated in its amplitude. In order to make possible a precise regulation of the amplitude of the additional alternating current even in the case of a small carrying force of the electromagnetic force compensation and of a correspondingly small direct compensating current, the invention proposes connecting in a voltage divider in parallel to the coil and the precision resistor which has a highly temperature-dependent resistor. In this parallel branch direct and alternating current are higher by a constant proportionality factor than in the main branch formed by coil and precision resistor. The parallel branch is also part of a resistance measuring bridge which regulates the amplitude of the additional alternating current in such a manner that the highly temperature-dependent resistor retains its theoretical excess temperature and therewith its theoretical resistance value.

4 Claims, 2 Drawing Figures

ELECTRONIC WEIGHING SCALE

BACKGROUND OF THE INVENTION

The invention concerns a weighing scale based on the principle of electromagnetic force compensation with at least one coil which is located in the air gap of a stationary permanent magnet system and is loaded over a position sensor and a gain control amplifier by a direct compensating current dependent on the load of the scale, with a precision resistor through which the same direct compensating current flows and at both ends of which a signal dependent on the load of the scale can be tapped off and fed to an analog to digital converter, and with an alternating voltage generator which is regulated in its amplitude by a central circuit and which allows an alternating current to flow at least through the coil in addition to the direct compensating current.

A scale of this type is known from German printed application No. 3,002,462 also U.S. Pat. No. 4,300,647 of the applicant.

The additional alternating current is designed to provide a load-independent excess temperature at least in the coil. In order to regulate the amplitude of the alternating voltage generator, the German printed application and U.S. Patent cited above, teaches that a heating resistor can be connected in series with the coil and with the precision resistor, the excess temperature of which is measured by a thermosensor or, its radiation intensity (when constructed as an incandescent filament) is measured by a radiation sensor and is regulated to a constant value. These circuits should be improved in as far as in scales with a low maximum load, that is, a small direct compensating current the electric power available for the heating resistor is very small, so that it is difficult to obtain an excess temperature which can be measured well or a sufficient radiation intensity.

The invention therefore has the task of indicating a simple circuit for the scale indicated above which allows a sensitive regulation of the amplitude of the alternating voltage generator to be obtained independently of the quantity of the direct compensating current.

SUMMARY OF THE INVENTION

The invention achieves the desired results as follows: A voltage divider circuit in parallel with the coil and the precision resistor is provided which has at least one highly temperature-dependent resistor, whereby the direct and alternating current through this highly temperature-dependent resistor is proportional to the direct and alternating current through the coil, and the control circuit regulates the amplitude of the alternating voltage generator in such a manner that the resistance value of the highly temperature-dependent resistor remains as constant as possible.

Thus, a parallel path to the coil and to the precision resistor is provided for regulating the amplitude of the alternating voltage generator, in which path the direct and the alternating current are e.g. 10 times greater than in the coil and in the precision resistor, so that very much more electric power is available. This parallel path also contains a highly temperature-dependent resistor and is constructed as a branch of a bridge circuit in such a manner the resistance value of this highly temperature-dependent resistor can be determined directly in the circuit and supplies the input signal of the control circuit for the amplitude of the alternating voltage generator.

It is advantageous if the highly temperature-dependent resistor is formed by the incandescent filament of an incandescent bulb. In this instance a very high excess temperature can be achieved, so that any changes in the ambient temperature can be disregarded.

In an advantageous embodiment of the invention the output of the alternating voltage generator is connected over a first capacitor to a center tapping of the coil and over a second capacitor to the midpoint of the voltage divider. In this embodiment the inductivity of the coil has no effect, so that the required alternating current can be achieved with small amplitudes of the alternating voltage generator. Likewise, the additional alternating current in the coil produces no force on the weighing system and can therefore cause no oscillations.

Moreover, the precision resistor can be bridged capacitively in order to keep the alternating current resistance low.

BRIEF DESCRIPTION OF THE DRAWINGS

The invention is described below with reference made to the drawings.

Figure 1:
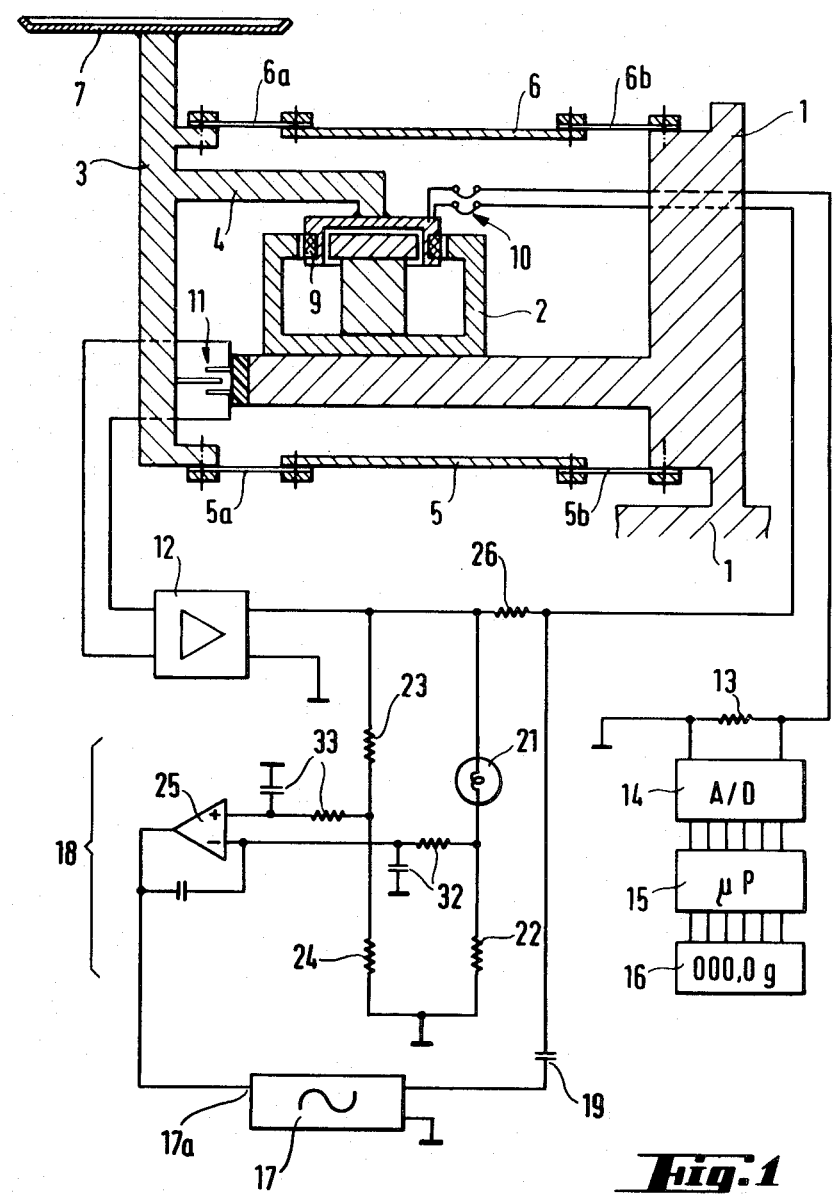
FIG. 1 shows a first embodiment of the electric scale.

The electric weighing scale according to FIG. 1 consists of a movable load carrier 3 which carries load pan 7 and is connected to the stationary part 1 of the scale over two guide rods 5 and 6 in the form of a parallel guide member. Leaf springs 5a, 5b, 6a, 6b at each end of guide rods 5 and 6 function as articulations. Load carrier 3 carries a coil 9 on a laterally projecting arm 4 which interacts with the field of a stationary permanent magnet system 2. Position sensor 11 senses the position of load carrier 3 and supplies the direct compensating current necessary to compensate the load over a gain control amplifier 12. This direct compensating current is supplied over flexible leads 10 of coil 9 and likewise flows through precision resistor 13. A current-proportional measuring voltage is tapped off at precision resistor 13, digitalized in an analog to digital converter 14, processed in a digital calculating circuit 15 and indicated in digital indicator 16.

A first voltage divider circuit 21, 22 in parallel with coil 9 and precision resistor 13 in the control circuit 18 is provided which consists of a highly temperature-dependent resistor in the form of the incandescent filament of an incandescent bulb 21 and of a fixed resistor 22. A second voltage divider circuit, consisting of two fixed resistors 23 and 24, is connected to the output of the gain control amplifier. An alternating voltage generator 17 is provided which allows an additional alternating current to flow capacitively over capacitor 19 through coil 9 and precision resistor 13 as well as through voltage divider 21, 22 and also through voltage divider 23, 24. The output of gain control amplifier 12 is constructed in a high-impedance manner as a current source, so that no alternating current can flow off over it. The circuit is balanced in such a manner with protective resistor 26 that the proportion of the currents through voltage divider 21, 22 on the one hand and through coil 9 and precision resistor 13 on the other hand is identical for direct current and alternating current. If, for example, the direct current through voltage divider 21, 22 should be 10 times greater than the direct current through coil 9 and precision resistor 13, the alternating current through voltage divider 21, 22 should also be 10 times greater than the alternating current through coil 9 and precision resistor 13. An enlarging of protective resistor 26 allows a greater direct current to flow through voltage divider 21, 22 at a constant direct compensating current, but a smaller alternating current, at an amplitude of alternating voltage generator 17 which is assumed to be constant likewise, so that a balance is possible.

The two voltage divider circuits 21, 22 and 23, 24 are dimensioned so that at the theoretical working point of highly temperature-dependent resistor 21 the bridge formed by them is balanced; the difference voltage at the input of integrating amplifier 25 is then zero, so that its output voltage does not change. This output voltage is fed to control input 17a of alternating voltage generator 17 and determines its amplitude, which therefore also remains constant. Details of the circuit of alternating voltage generator are explained in German printed application No. 3,002,642 cited above.

If, for example, an additional load is placed on load pan 7, the direct compensating current supplied from gain control amplifier 12 rises. This causes the power loss to rise in coil 9, precision resistor 13, highly temperature-dependent resistor 21 and in fixed resistors 22, 23 and 24. This results in highly temperature-dependent resistor 21 in a change in resistance and in the embodiment of FIG. 1 in which highly temperature-dependent resistor 21 is the incandescent filament of an incandescent bulb with positive temperature coefficient in a rise in the resistance. Due to the action, the bridge formed by resistors 21 to 24 is no longer balanced and integrating amplifier 25 receives a direct difference voltage freed by RC members 32 and 33 from the alternating voltage portion, so that the control voltage for alternating voltage generator 17 and therewith its alternating voltage amplitude decreases until the power loss in highly temperature-dependent resistor 21 has regained its theoretical value. The proportionality of the direct and alternating currents in coil 9 and precision resistor 13 on the one hand and in highly temperature-dependent resistor 21 on the other hand causes the power loss to remain at its theoretical value in coil 9 and in precision resistor 13 also.

Figure 2:
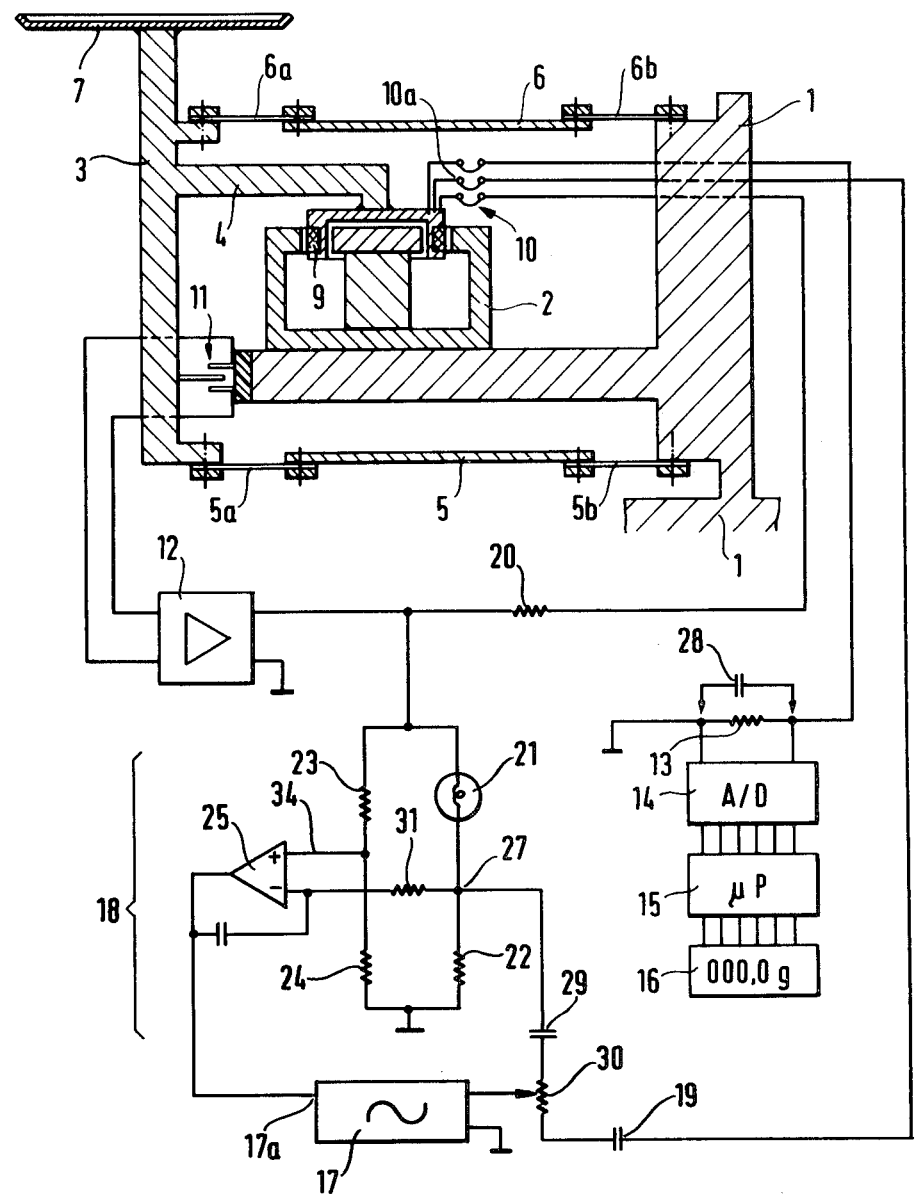
FIG. 2 shows a second embodiment of the electric scale.

FIG. 2 shows another embodiment of the electronic weighing scale. The parts of FIG. 2 identical to those in FIG. 1 are designated by the same reference numerals. In this embodiment the output of alternating voltage generator 17 is connected over capacitor 19 to center tapping 10a of coil 9. The additional alternating current then flows off from center tapping 10a on the one hand over the one coil half and precision resistor 13 and on the other hand over the other coil half, balancing resistor 20 and the output of gain control amplifier 12, which output is of low impedance in this embodiment. Balancing resistor 20 is balanced in such a manner that these two partial currents are identical.

The output of alternating voltage generator 17 is further connected over capacitor 29 to the midpoint 27 of voltage divider 21, 22, so that an additional alternating current also flows over fixed resistor 22 and highly temperature-dependent resistor 21. Balancing potentiometer 30 is set so that the direct and the alternating current in coil 9 and in precision resistor 13 are again proportional to the direct and the alternating current in highly temperature-dependent resistor 21.

Resistors 21 to 24 again form a resistance measuring bridge which is supplied with voltage from the output of gain control amplifier 12. In the case of deviations of the resistance value of highly temperature-dependent resistor 21 from its theoretical value integrating amplifier 25 readjusts the amplitude of alternating voltage generator 17 until this theoretical value has been regained. On account of the proportionality of the direct and alternating currents in highly temperature-dependent resistor 21 on the one hand and in coil 9 and precision resistor 13 on the other hand, a constant power loss in highly temperature-dependent resistor 21 also means a constant power loss in coil 9 and in precision resistor 13.

Variants of these circuits are readily apparent to anyone skilled in the art. For example, a fixed resistor can be used instead of highly temperature-dependent resistor 21 with positive temperature coefficient, and resistor 22 is constructed with negative coefficiency instead of a fixed resistor. It is even possible for both resistors 21 and 22 to have a temperature coefficient with opposite sign, which raises the sensitivity of the circuit.

Moreover, it is possible, for example, to dispense with voltage divider 23, 24 if the resistance value of fixed resistor 23 approximately coincides with the theoretical value of highly temperature-dependent resistor 21. In this instance the 1:1 voltage divider formed by balancing resistor 20 and the one half of coil 9 on the one hand and by the other half of coil 9 and precision resistor 13 on the other hand can be used. Input 34 of integrating amplifier 25 would therefore have to be connected over an RC member to suppress the alternating voltage to central tapping 10a of coil 9.

It can also be sufficient in weighing scales with a low direct compensating current if the power loss in coil 9 remains load-independent. In this instance the precision resistor can be bridged by a capacitor 28 shown in FIG. 2. Balancing resistor 20 then needs only a very small resistance value. Balancing potentiometer 30 would then have to be set to be unbalanced in correspondence. This variant has the advantage that on account of the small balancing resistor 20 practically the full direct output voltage of gain control amplifier 12 is available for coil 9 and precision resistor 13.

We claim:
1. In an electronic weighing scale based on the principle of electromagnetic force compensation having
   (a) at least one coil which is located in an air gap of a stationary permanent magnet system and is loaded over a position sensor (11) and a gain control amplifier (12) by a direct compensating current dependent on the load on the scale,
   (b) a precision resistor (13) through which the same direct compensating current flows and at both ends of which a signal dependent on the load of the scale can be tapped off and fed to an analog to digital converter,
   (c) and an alternating voltage generator (17) which is regulated in its amplitude by a control circuit and which allows an alternating current to flow at least through the coil in addition to the direct compensating current, wherein the improvement comprises including a voltage divider circuit (21, 22) in parallel with the coil (9) and the precision resistor (13) is provided which has at least one highly temperature-dependent resistor (21), whereby the direct and alternating current through this highly temperature-dependent resistor (21) is proportional to the direct and alternating current through the coil (9); a control circuit (18) regulates the amplitude of the alternating voltage generator (17) in such a manner that the resistance value of the highly temperature-dependent resistor (21) remains as constant as possible.

2. The electronic weighing scale according to claim 1, wherein the highly temperature-dependent resistor (21) is formed by the incandescent filament of an incandescent bulb.

3. The electronic weighing scale according to claim 2, wherein the output of the alternating voltage generator (17) is connected over a capacitor (19) to a center tapping (10a) of the coil (9) and over another capacitor (29) to the midpoint (27) of the voltage divider (21, 22).

4. The electronic weighing scale according to claim 3, wherein the precision resistor (13) is capacitively bridged by a third capacitor (28).

* * * * *